United States Patent
Wessén et al.

(10) Patent No.: US 11,478,929 B2
(45) Date of Patent: Oct. 25, 2022

(54) METHOD FOR DETERMINING POSSIBLE TRANSITIONS OF SYSTEM STATES

(71) Applicant: ABB Schweiz AG, Baden (CH)

(72) Inventors: Johan Wessén, Västerås (SE); Ivan Lundberg, Västerås (SE); Sead Travancic, Kolbäck (SE)

(73) Assignee: ABB Schweiz AG, Baden (CH)

( * ) Notice: Subject to any disclaimer, the term of this patent is extended or adjusted under 35 U.S.C. 154(b) by 295 days.

(21) Appl. No.: 16/348,463

(22) PCT Filed: Nov. 9, 2016

(86) PCT No.: PCT/EP2016/077040
§ 371 (c)(1),
(2) Date: May 8, 2019

(87) PCT Pub. No.: WO2018/086677
PCT Pub. Date: May 17, 2018

(65) Prior Publication Data
US 2019/0270202 A1 Sep. 5, 2019

(51) Int. Cl.
*B25J 9/16* (2006.01)
*G05B 19/418* (2006.01)
*G06F 9/448* (2018.01)

(52) U.S. Cl.
CPC ............ *B25J 9/1661* (2013.01); *B25J 9/161* (2013.01); *G05B 19/41865* (2013.01);
(Continued)

(58) Field of Classification Search
CPC ... B25J 9/1661; B25J 9/161; G05B 19/41865; G05B 19/41885; G05B 2219/23289;
(Continued)

(56) References Cited

U.S. PATENT DOCUMENTS 4,967,386 A * 10/1990 Maeda .................... G06F 30/20
703/17
5,937,181 A * 8/1999 Godefroid ................ G06F 8/73
703/22
(Continued)

FOREIGN PATENT DOCUMENTS

WO 0138978 A1 5/2001

OTHER PUBLICATIONS

Wu; "Autonomous Robot Control Using Ebidential Reasoning"; Fourth International Conference on Fuzzy Systems and Knowledge Discovery, Proc. of FSKD'07; Aug. 2007; pp. 550-554 (Year: 2007).*

(Continued)

*Primary Examiner* — Stephen Holwerda
(74) *Attorney, Agent, or Firm* — Whitmyer IP Group LLC

(57) ABSTRACT

A method for determining possible transitions of system states in an industrial system with a plurality of agents with discrete agent states. The method comprises the steps of defining a plurality of rules, each rule comprising a precondition of at least one agent state that is to be changed, a post-condition of the at least one agent state, and an action or actions resulting in a corresponding transition of the at least one agent state; defining a plurality of nodes, each node comprising a system state; and evaluating for a plurality of pairs of nodes, whereby one node of each pair acts as a pre-condition node and the other node of each pair acts as a post-condition node, whether the pair can, given the rules, be directly connected by an edge, each edge comprising an action or actions required for a transition between the respective pre- and post-condition system states.

10 Claims, 2 Drawing Sheets

(52) U.S. Cl.
CPC .................. G05B 19/41885 (2013.01); *G05B 2219/23289* (2013.01); *G05B 2219/50391* (2013.01); *G06F 9/4498* (2018.02); *Y02P 90/02* (2015.11)

(58) Field of Classification Search
CPC ........... G05B 2219/50391; Y02P 90/02; Y02P 90/26; Y02P 90/20; G06F 9/4498
See application file for complete search history.

(56) References Cited

U.S. PATENT DOCUMENTS

| | | | | |
|---|---|---|---|---|
| 6,282,455 | B1* | 8/2001 | Engdahl | G05B 23/0216 700/83 |
| 9,314,924 | B1 | 4/2016 | Laurent et al. | |
| 10,126,747 | B1* | 11/2018 | Svec | G16Z 99/00 |
| 2003/0046658 | A1* | 3/2003 | Raghavan | G06F 8/44 717/106 |
| 2003/0135533 | A1* | 7/2003 | Cook | G06F 8/34 718/1 |
| 2005/0278049 | A1* | 12/2005 | Van Den Nieuwelaar et al. | G05B 19/41865 700/100 |
| 2011/0153080 | A1 | 6/2011 | Shapiro et al. | |
| 2012/0290261 | A1* | 11/2012 | Genta | G05B 23/00 702/179 |
| 2014/0088763 | A1 | 3/2014 | Hazan | |
| 2014/0317035 | A1 | 10/2014 | Szatmary et al. | |
| 2014/0336811 | A1* | 11/2014 | Yuki | G05B 19/4093 700/213 |
| 2015/0018977 | A1 | 1/2015 | Law et al. | |

OTHER PUBLICATIONS

Fok; "An Automatic Navigation System for Vision Guided Vehicles Using a Double Heuristic and a Finite State Machine"; IEEE Trans. Robot. Automat., vol. 7; Feb. 1991; pp. 181-188 (Year: 1991).*
Wu; "Autonomous Robot Control Using Evidential Reasoning"; Fourth International Conference on Fuzzy Systems and Knowledge Discovery, Proc. of FSKD'07; Aug. 2007; pp. 550-554 (Year: 2007).*
Matteo Leonetti et al.: "Automatic Generation and Learning of Finite-State Controllers", Sep. 12, 2012, Artifical Intelligence: Methodology, Systems, and Appications, Springer Berlin Heidelberg, Berlin, Heidelberg, XP047015805 pp. 135-144.
Graham N. C. Kirby et al.: "Design, Implementation and Deployment of State Machines Using a Generative Approach", in: "Network and Parallel Computing", Jan. 1, 2008 Springer International Publishing, Cham 032548, XP055389088, vol. 5135, pp. 175-198.
Wolfgang Grieskamp et al.: "Generating finite state machines from abstract state machines", Software Engineering Notes, ACM, New York, US vol. 27, Jul. 1, 2002 XP058264907 pp. 112-122.
International Search Report and Written Opinion of the International Searching Authority Application No. PCT/EP2016/077040 Completed: Jul. 7, 2017; dated Jul. 17, 2017 14 pages.
Chinese Office Action; Application No. 201680090119.X; dated Aug. 27, 2021; 6 pages.
European Office Action; Application No. 16 801 977.6; dated Nov. 8, 2021; 4 Pages.

* cited by examiner

METHOD FOR DETERMINING POSSIBLE TRANSITIONS OF SYSTEM STATES

TECHNICAL FIELD

The present invention relates to control of an industrial system comprising a plurality of agents with discrete agent states.

BACKGROUND

Creating a program for an industrial system comprising an industrial robot is difficult and time consuming. One major reason is that there is a vast number of incorrect states that need to be handled, so that the robot program can continue without interruption.

Today this work is iterative, hard to get right and probably impossible for robotic systems comprising several agents, such as a cell with multiple collaborative robots. When any program of this type is constructed, there is no way to determine if it will handle all possible error cases.

US2014088763 discloses a method for determining an efficient robot-base position that has the shortest, collision free robotic path between start and end nodes. The method includes a step of generating for the valid robot-base position respective directed graphs providing a plurality of robotic paths. A robotic system generates directed graphs for the respective valid robot-base positions. A valid robot-base position is defined as a robot-base position from which the end of arm may reach a target to perform predetermined tasks without causing a collision. The directed graph provides a plurality of robotic paths with a plurality of nodes including a start and an end node, and a plurality of directional connectors connecting the nodes. The nodes are arranged based on the ordered locations and the directional connectors have respective weight factors. The nodes represent the robot joint configurations at the ordered locations and the weight factors represent the effort required by the robot-joint to move from a source to a target. The robotic system determines the shortest route between the start and end nodes for the valid robot-base positions using the directed graph. The shortest robotic path is determined based on the weight-factors of the directional connectors that connect the nodes.

The robotic system of US2014088763 has an infinite number of states, because the motion path is continuous. A number of points or states are randomly determined and these are stored as nodes in the graph. The points selected are thus not optimal, and each time the nodes are determined, different points will be associated with the nodes. Due to the infinite number of points, all the states of the robotic system will never be determined.

SUMMARY

One object of the invention is to provide an improved method for determining possible transitions of system states in an industrial system with a plurality of agents with discrete agent states.

A further object of the invention is to provide an improved robotic system.

These objects are achieved by the device according to appended claim 1 and the method according to appended claim 7.

The invention is based on the realization that by determining possible direct transitions between the system states offline, fast runtime decisions by system's controller are allowed to take place.

According to a first aspect of the invention, there is provided a method for determining possible transitions of system states in an industrial system with a plurality of agents with discrete agent states. The method comprises the steps of: defining a plurality of rules, each rule comprising a pre-condition of at least one agent state that is to be changed, a post-condition of the at least one agent state, and an action or actions resulting in a corresponding transition of the at least one agent state; defining a plurality of nodes, each node comprising a system state; and evaluating for a plurality of pairs of nodes, whereby one node of each pair acts as a pre-condition node and the other node of each pair acts as a post-condition node, whether the pair can, given the rules, be directly connected by means of an edge, each edge comprising an action or actions required for a transition between the respective pre- and post-condition system states.

According to one embodiment of the invention, the plurality of nodes comprises all the nodes existing in the respective industrial system.

According to one embodiment of the invention, the method comprises the step of directly connecting a plurality of pairs of nodes by means of edges.

According to one embodiment of the invention, the method comprises the step of defining all available edges between all pairs of nodes among the plurality of nodes.

According to one embodiment of the invention, the method comprises the step of optimizing transitions by determining preferred chains of transitions among the possible transitions.

According to one embodiment of the invention, the method comprises the step of collecting the optimized transitions into a look-up table.

According to a second aspect of the invention, there is provided a robotic system comprising an industrial robot with a robot controller. The robot controller is configured to carry out the method according to any of the preceding embodiments.

BRIEF DESCRIPTION OF THE DRAWINGS

The invention will be explained in greater detail with reference to the accompanying drawings, wherein.

DETAILED DESCRIPTION

Figure 1:
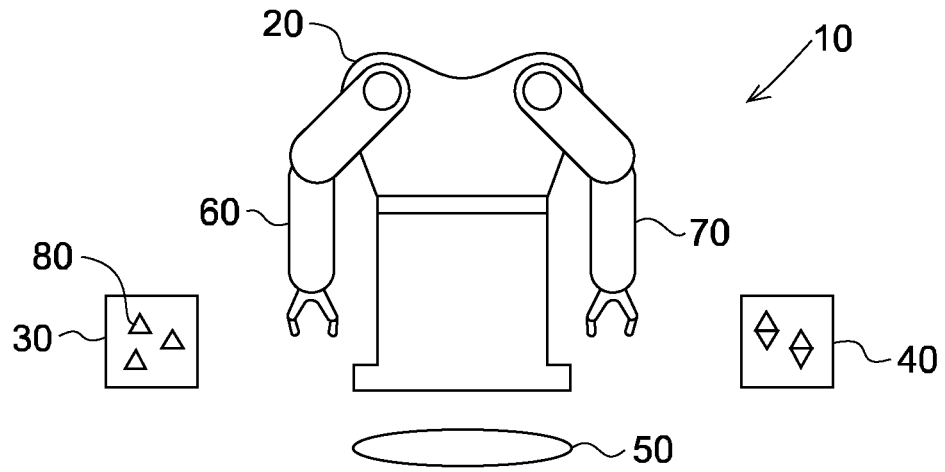
FIG. 1 shows a robotic system according to one embodiment of the invention.

Referring to FIG. 1, an example of an industrial system in the form of a robotic system 10 on which the present invention can be applied comprises an industrial robot 20, a left feeder 30, a right feeder 40 and a waste bin 50. The two arms 60, 70 of the robot 20 are defined as agents having discrete agent states, the robotic system 10 thereby comprising a first agent in the form of a left arm (LA) 60, and a second agent in the form of a right arm (RA) 70. The robotic system 10 is configured to repeatedly carry out the following tasks. The left arm 60 picks a first item 80 from the left feeder 30 and hands the first item 80 over to the right arm 70 in a first manner allowing the right arm 70 to receive the first item 80. The right arm 70 receives the first item 80 in a first manner. The left arm 60 further picks a second item 80 from the left feeder 30 and hands the second item 80 over to the right arm 70 in a second manner allowing the right arm 70 to receive the second item 80 such that the second item 80 connects to the first item 80. The right arm 70 receives the second item 80 a second manner such that the second item 80 connects to the first item 80. The right arm 70 sets the combination of the first and second items 80 on the right feeder 40.

Both the left arm 60 and the right arm 70 thereby has discrete agent states "empty" denoted by digit 0 and "hold an item" denoted by digit 1. The right arm 70 furthermore has an agent state "hold a combination of two items" denoted by digit 2. If it was assumed that the robotic system 10 always works perfectly, no other agent states were needed to continuously carry out the given tasks. However, to provide a more illustrative example it is instead assumed that the left arm 60 sometimes picks an item 80 incorrectly, and the right arm 70 sometimes receives an item 80 incorrectly, such that both the left arm 60 and the right arm 70 furthermore has an agent state "hold an item incorrectly" denoted by digit 3. The robotic system 10 is configured to correct the agent state 3 (hold an item incorrectly) by the respective arm throwing the respective item 80 into the waste bin 50 and picking or receiving a new item 80, respectively. The left arm 60 and the right arm 70 can also have additional agent states, but it is not necessary to consider them for the purposes of the present example. It is assumed that the robotic system 10 comprises sensors that allow identification of each considered agent state such that at each point in time agent states of all agents are known.

A system state can be expressed as a combination of all agent states of the robotic system 10. System states can be expressed e.g., by means of nodes 90 (see FIGS. 2*a*-2*c*), each node 90 comprising a component for each agent, the value of each component corresponding to an agent state of the respective agent. Since, due to the earlier assumption, all agent states are known at each point in time, also the system state is always known. In the present example the nodes 90 have two components, the first component representing the left arm 60, and the second component representing the right arm 70. The first component may get at least the values 0, 1 and 3 ("empty", "hold an item" and "hold an item incorrectly"), and the second component may get at least the values 0, 1, 2 and 3 ("empty", "hold an item", "hold a combination of two items" and "hold an item incorrectly"), and the robotic system 10 may thereby get twelve unique system states (0, 0), (0, 1), (0, 2), (0, 3), (1, 0), (1, 1), (1, 2), (1, 3), (3, 0), (3, 1), (3, 2) and (3, 3) as illustrated in table 1 and in FIGS. 2*a*-2*c*.

TABLE 1

| LA | RA 0 | 1 | 2 | 3 |
|---|---|---|---|---|
| 0 | (0, 0) | (0, 1) | (0, 2) | (0, 3) |
| 1 | (1, 0) | (1, 1) | (1, 2) | (1, 3) |
| 3 | (3, 0) | (3, 1) | (3, 2) | (3, 3) |

In order to perform transitions between different system states the robotic system 10 needs to carry out an action or actions 130 (see FIGS. 2*a* to 2*c*) that change the state of one or more agents. Available actions 130 depend on the configuration of the robotic system 10. In the present example the left arm 60 is configured to carry out the actions 130 "pick" denoted by "P", "hand in first manner" denoted by "H1", "hand in second manner" denoted by "H2" and "throw left" denoted by "TL", and the right arm 70 is configured to carry out the actions 130 "receive in first manner" denoted by "R1", "receive in second manner" denoted by "R2", "set" denoted by "S" and "throw right" denoted by "TR". A programmer familiar with the robotic system's 10 configuration, and also familiar with the tasks to be carried out by the robotic system 10, defines rules R (R1, R2, . . . ) that determine appropriate actions 130 to be taken at certain pre-condition in order to arrive at an expected post-condition. Each rule R comprises a pre-condition of at least one agent state that is to be changed, a post-condition of the at least one agent state, and an action or actions 130 resulting in a corresponding transition of the at least one agent state.

TABLE 2

| | Pre-condition | | Action | | Post-condition | |
|---|---|---|---|---|---|---|
| | LA | RA | LA | RA | LA | RA |
| $R_1$ | 0 | — | P | — | 1 | — |
| $R_2$ | 1 | 0 | H1 | R1 | 0 | 1 |
| $R_3$ | 1 | 1 | H2 | R2 | 0 | 2 |
| $R_4$ | — | 2 | — | S | — | 0 |
| $R_5$ | 3 | — | TL | — | 0 | — |
| $R_6$ | — | 3 | — | TR | — | 0 |

In the present example six rules R according to table 2 are defined. The first rule R1 determines that whenever the left arm 60 has the agent state 0 (empty), the appropriate action 130 is P (pick), and the expected left arm agent state after the action 130 is 1 (hold an item). Neither the agent state nor the action 130 of the right arm 70 has significance when changing the left arm agent state from 0 to 1, and therefore the corresponding cells in table 2 are marked with "x". Similar insignificant agent states and actions 130 can be found in rules R4, R5 and R6. According to rules R2 and R3, however, the left arm agent state cannot be changed from 1 to 0 without the interaction of the right arm 70, and similarly the right arm agent state cannot be changed from 0 to 1 or from 1 to 2 without the interaction of the left arm 60. Of course the hardware configuration of the robotic system 10 would allow the left arm agent state to be changed from 1 to 0 without the interaction of the right arm 70, namely by carrying out the action 130 TR (throw left), but the rules R reflecting the given tasks to be carried out by the robotic system 10 do not allow this as throwing the item 80 into the waste bin 50 would not serve the purpose of carrying out the given tasks. On the other hand, the hardware configuration does not allow the right arm agent state to be changed from 0 to 1 or from 1 to 2 without the interaction of the left arm 60 as it is assumed that the right arm 70 is not able to reach for items 80 from the left feeder 30 on its own.

Figure 2A:
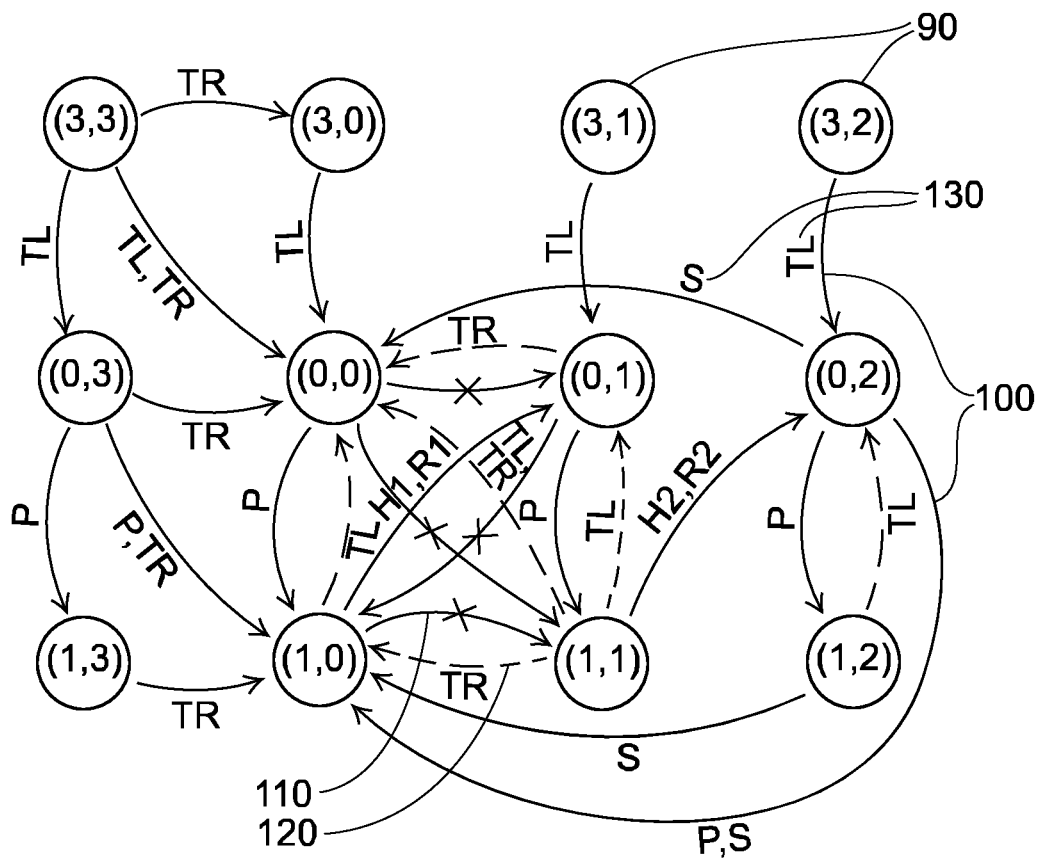
FIG. 2a shows a directed graph illustrating potential transitions between different system states in the robotic system of FIG. 1.

When the rules R are set, potential transitions between different system states can be defined as illustrated in the directed graph of FIG. 2*a*. Pairs of nodes 90 are connected by means of edges 100 in between, one node 90 of each pair acting as a pre-condition node 90 and the other node 90 of each pair acting as a post-condition node 90. Each edge 100 comprises an action or actions 130 required for the direct transition between the respective pre- and post-condition system states. The edges 100 are illustrated with solid line arrows provided with respective actions 130. The important thing to notice is that not all pairs of nodes 90 can be directly connected by means of an edge 100, and that the pairs that can be connected by means of an edge 100 can only be connected in one direction but not in the opposite direction. Examples of first potential connections 110 that are not possible due to limitations of the available actions 130 are illustrated with solid line arrows provided with crosses. Examples of second potential connections 120 that would be possible with the available actions 130 but that do not fulfill the rules R are illustrated with dotted line arrows provided with respective actions 130. For example, the robotic system 10 cannot carry out a direct transition from the system state (1, 0) to (1, 1) since the hardware configuration of the robotic system 10 determines that the right arm 70 can only receive an item 80 from the left arm 60. The situation would be different should the right arm 70 be able to reach for items 80 from the left feeder 30 on its own and should the robotic system 10 comprise a corresponding action 130. The robotic system 10 is also not configured to carry out a direct transition from the system state (1, 1) to (1, 0) since such transition does not fulfil the rules R.

As established earlier, not all pairs of nodes 90 can be directly connected by means of an edge 100. On the other hand, in the present example all the nodes 90 can be connected with all the remaining nodes 90 via indirect transitions involving one or more nodes 90 between the pair of nodes 90 to be connected. Please notice that this would not be the case if e.g., the actions 130 TL and TR were not determined although the agent states 3 (hold an item incorrectly) could occur. An industrial system 10 that can end up with a system state from where it is lacking a strategy to get away to continue carrying out the given tasks runs a risk to get stuck. The present invention allows detection of such system states in advance i.e., offline before commissioning of the industrial system 10.

In FIG. 2a all existing edges 100 of robotic system 10 in the given example, eighteen in total, are illustrated, but all potential connections 110, 120 are not. It is to be noted that already in the very simple robotic system 10 of the given example with 12 nodes 90 the total number of edges 100 and potential connections 110, 120 (between all pairs of nodes 90 in both directions) becomes high, 132 in total ($Z*(Z-1)$, wherein Z is the number of nodes 90), and for a more complicated industrial system 10 one could not readily manually detect the edges 100. According to the present invention the edges 100 are detected automatically by evaluating for a plurality of pairs of nodes 90, whether the pair can, given the rules R, be directly connected by means of an edge 100 or not. Preferably the evaluation is carried out for all pairs of nodes 90 existing in the respective industrial system 10.

To this end all the nodes 90 to be considered are determined, and for each node 90 it is evaluated whether it can be directly connected by means of an edge 100 to each of the remaining nodes 90. Referring to tables 3, 4 and 5, this is done by creating a separate table for each node 90 (acting as a pre-condition node 90 whose components represent pre-conditions of the respective agent states) in combination with each of the remaining nodes 90 (acting as a post-condition node 90 whose components represent post-conditions of the respective agent states). Each table has 2*n columns and m rows, where n is the number of agents and m is the number of rules R. Each row represents a respective rule R, the first row representing the first rule R1, the second row representing the second rule R2, and so on. Each column represents a component of a node 90, the first n columns representing the components of a pre-condition node 90, and the last n columns representing the components of a post-condition node 90. In the table values are inserted that indicate firstly whether the respective component is significant for the respective rule R, and secondly whether the components that are significant fulfil the respective rule R. In each table cells that represent insignificant components are marked with a dash, cells that represent components fulfilling the rule R are given a value 1, and cells that represent components not fulfilling the rule R are given a value 0.

TABLE 3

| (0, 2) → (1, 0) | | | |
|---|---|---|---|
| 1 | — | 1 | — |
| 0 | 0 | 0 | 0 |
| 0 | 0 | 0 | 0 |
| — | 1 | — | 1 |
| 0 | — | 0 | — |
| — | 0 | — | 0 |
| Sum 1 | 1 | 1 | 1 |

Continuing with the example explained hereinbefore, the exercise is carried out to evaluate whether a pre-condition node 90 with components (0, 2) can be directly connected by means of an edge 100 to a post-condition node 90 with components (1, 0), see table 3. A corresponding table has four columns (n=2) and six rows (m=6). Regarding the first rule R1, it is first established that the second components of the pre-condition and post-condition nodes 90 are insignificant, and the corresponding cells are marked with dashes. It is secondly established that the first components of the pre-condition and post-condition nodes 90 are significant and fulfil the first rule R1 as both the pre-condition and the post-condition of the first rule R1 are fulfilled. The corresponding cells are thereby given values 1. Regarding the second and third rules R2, R3, it is established that both components of the pre-condition and post-condition nodes 90 are significant, but that they do not fulfil the second or third rules R2, R3 as not both the pre-condition and the post-condition of the second or third rules R2, R3 are fulfilled. The corresponding cells are thereby given values 0. Regarding the fourth rule R4, it is first established that the first components of the pre-condition and post-condition nodes 90 are insignificant, and the corresponding cells are marked with dashes. It is secondly established that the second components of the pre-condition and post-condition nodes 90 are significant and fulfil the fourth rule R4 as both the pre-condition and the post-condition of the fourth rule R4 are fulfilled. The corresponding cells are thereby given values 1. Regarding the fifth and sixth rules R5, R6, it is first established that for the fifth rule R5 the second components, and for the sixth rule R6 the first components, respectively, of the pre-condition and post-condition nodes 90 are insignificant, and the corresponding cells are marked with dashes. It is secondly established that for the fifth rule R5 the first components, and for the sixth rule R6 the second components, respectively, of the pre-condition and post-condition nodes 90 are significant, but that they do not fulfil the fifth or sixth rules R5, R6 as not both the pre-condition and the post-condition of the fifth or sixth rules R5, R6 are fulfilled. The corresponding cells are thereby given values 0.

When the table is filled in completely, the cell values in columns representing components whose post-condition is different from the pre-condition are summed. If all such sums have a value ≥ it is determined that the corresponding pre-condition node 90 can be directly connected by means of an edge 100 to the corresponding post-condition node 90 i.e., a direct transition from the system state of the precondition node 90 to the system state of the post-condition node 90 can be carried out. If at least one such sum has a value 0, it is determined that the corresponding pre-condition node 90 cannot be directly connected by means of an edge 100 to the corresponding post-condition node 90. For columns representing components whose post-condition and pre-condition are the same, no cell values are summed but the sums are marked with dashes instead. This implies the fact that no action 130 is needed to keep an agent state the same.

TABLE 4

| (0, 0) → (1, 1) | | | |
| --- | --- | --- | --- |
| 1 | — | 1 | — |
| 0 | 0 | 0 | 0 |
| 0 | 0 | 0 | 0 |
| — | 0 | — | 0 |
| 0 | — | 0 | — |
| sum 1 | 0 | 1 | 0 |

TABLE 5

| (0, 2) → (1, 2) | | | |
| --- | --- | --- | --- |
| 1 | — | 1 | — |
| 0 | 0 | 0 | 0 |
| 0 | 0 | 0 | 0 |
| — | 0 | — | 0 |
| 0 | — | 0 | — |
| — | 0 | — | 0 |
| sum 1 | — | 1 | — |

The column sums of the tables 3, 4 and 5 indicate that the direct transitions (0, 2) to (1, 0) and (0, 2) to (1, 2) are possible while the direct transition (0, 0) to (1, 1) is not.

Figure 2B:
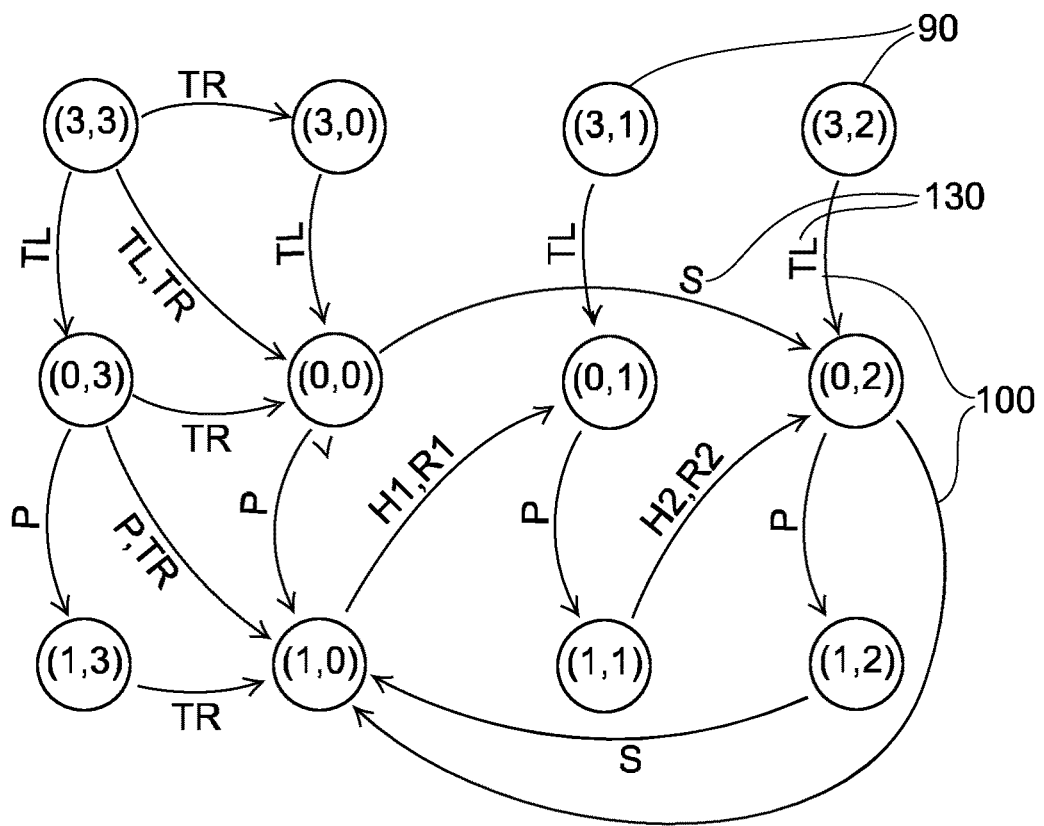
FIG. 2b shows a directed graph illustrating existing transitions in the robotic system of FIG. 1.
Figure 2C:
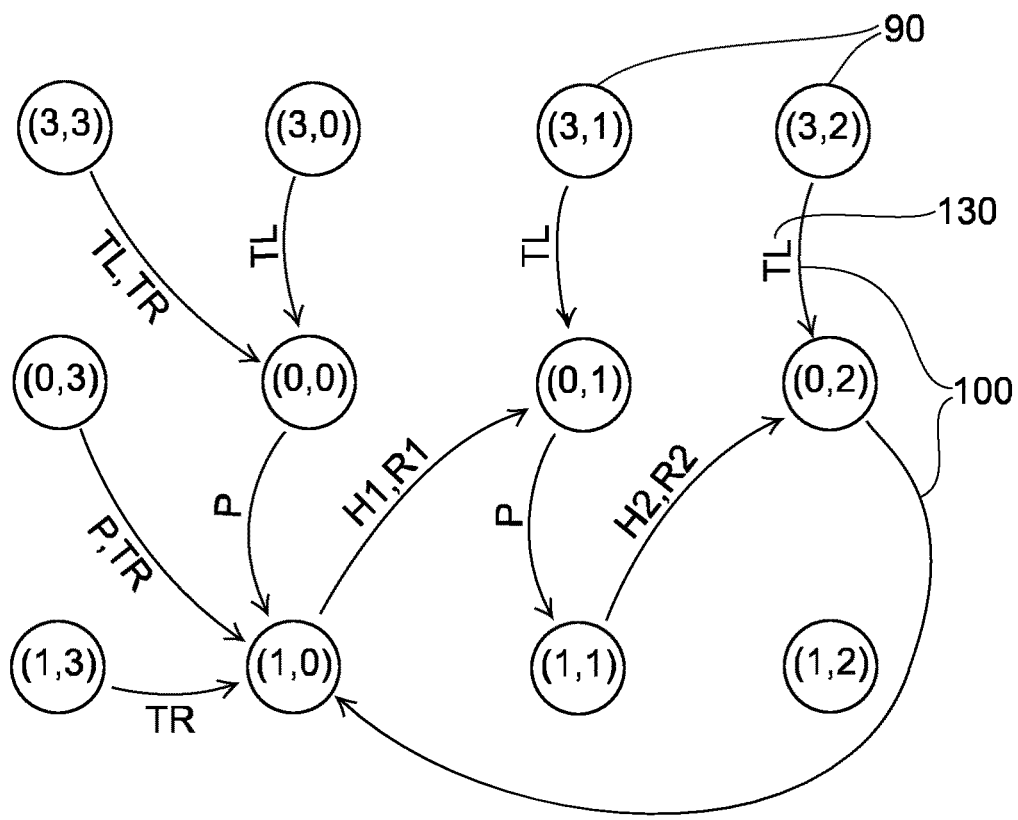
FIG. 2c shows a directed graph illustrating optimized transitions in the robotic system of FIG. 1.

The resulting available transitions, as illustrated in the directed graph of FIG. 2b, allow the robotic system 10 to make fast decision as to what action or actions 130 to take in order to continue carrying out the given tasks. It can e.g., be readily seen that the robotic system 10 has three alternatives to carry out the transition (0, 2) to (1, 0), and as these alternatives are already determined offline, the robotic system 10 avoids making corresponding time-consuming evaluations in the runtime. The list of available transitions can furthermore be optimized by determining preferred chains of transitions. For this purpose a search algorithm such as Dijkstra's algorithm may be used to finds preferred chains of transitions that carry out the desired transitions in the most cost-efficient manner. The resulting optimized transitions, as illustrated in the directed graph of FIG. 2c, can be collected into a look-up table to allow even faster runtime decisions by the robotic system 10 to take place.

The invention is not limited to the embodiments shown above, but the person skilled in the art may modify them in a plurality of ways within the scope of the invention as defined by the claims.

The invention claimed is:

1. A method for determining possible transitions of system states in an industrial system with a plurality of agents with discrete agent states, wherein the method comprises the steps of:

defining a plurality of rules, each rule having a pre-condition of at least one agent state that is to be changed, a post-condition of the at least one agent state, and an action or actions resulting in a corresponding transition of the at least one agent state;

defining a plurality of nodes, each node having a system state expressed as a combination of the discrete agent states of the plurality of agents;

for a plurality of pairs of nodes, whereby one node of each pair acts as a pre-condition node and the other node of each pair acts as a post-condition node, evaluating whether the pair is directly connectable by an edge and fulfills the rules to determine a possible transition of system states, each edge including an action or actions required for a direct transition from the respective pre-condition system state to the respective post-condition system state;

sending a signal based on the evaluation to the plurality of agents for driving the agents to perform the action or actions for carrying out a task.

2. The method according to claim 1, wherein the plurality of nodes includes all the nodes existing in the respective industrial system.

3. The method according to claim 1, wherein the method includes the step of directly connecting a plurality of pairs of nodes by edges.

4. The method according to claim 1, wherein the method includes the step of defining all available edges between all pairs of nodes among the plurality of nodes.

5. The method according to claim 1, wherein the method includes the step of optimizing transitions by determining preferred chains of transitions among the possible transitions.

6. The method according to claim 5, wherein the method includes the step of collecting the optimized transitions into a look-up table.

7. The method according to claim 2, wherein the method includes the step of directly connecting a plurality of pairs of nodes by edges.

8. The method according to claim 2, wherein the method includes the step of defining all available edges between all pairs of nodes among the plurality of nodes.

9. The method according to claim 2, wherein the method includes the step of optimizing transitions by determining preferred chains of transitions among the possible transitions.

10. A robotic system comprising an industrial robot having a plurality of agents with discrete agent states, and a robot controller configured to carry out a method for determining possible transitions of system states, including the steps of:

defining a plurality of rules, each rule having a pre-condition of at least one agent state that is to be changed, a post-condition of the at least one agent state, and an action or actions resulting in a corresponding transition of the at least one agent state;

defining a plurality of nodes, each node having a system state expressed as a combination of the discrete agent states of the plurality of agents;

for a plurality of pairs of nodes, whereby one node of each pair acts as a pre-condition node and the other node of each pair acts as a post-condition node, evaluating whether the pair is directly connectable by an edge and fulfills the rules to determine a possible transition of system states, each edge including an action or actions required for a direct transition from the respective pre-condition system state to the respective post-condition system state;

sending a signal based on the evaluation to the plurality of agents for driving the agents to perform the action or actions for carrying out a task.

* * * * *